United States Patent [19]

Bender et al.

[11] Patent Number: 5,266,647

[45] Date of Patent: Nov. 30, 1993

[54] BRANCHED COPOLYMERS

[75] Inventors: Dietmar Bender, Schifferstadt; Klaus Bronstert, Carlsberg; Hans-Michael Walter, Freinsheim; Daniel Wagner, Bad Duerkheim; Helmut Mach, Heidelberg, all of Fed. Rep. of Germany

[73] Assignee: BASF Aktiengesellschaft, Ludwigshafen, Fed. Rep. of Germany

[21] Appl. No.: 596,384

[22] Filed: Oct. 12, 1990

[30] Foreign Application Priority Data

Oct. 14, 1989 [DE] Fed. Rep. of Germany ....... 3934450

[51] Int. Cl.$^5$ .................. C08F 297/00; C08F 297/04; C08F 293/00
[52] U.S. Cl. ................................ 525/314; 525/333.2; 525/333.5
[58] Field of Search .................... 525/271, 314, 333.2, 525/333.5

[56] References Cited

U.S. PATENT DOCUMENTS

| | | | |
|---|---|---|---|
| 4,791,162 | 12/1988 | Vanderhoff et al. | 524/458 |
| 4,849,481 | 7/1989 | Rhodes et al. | |
| 4,894,315 | 1/1990 | Feinburg et al. | 430/281 |
| 5,075,192 | 12/1991 | Fryd et al. | 430/281 |

FOREIGN PATENT DOCUMENTS

| | | |
|---|---|---|
| 0161021 | 11/1985 | European Pat. Off. |
| 1128666 | 4/1962 | Fed. Rep. of Germany |
| 2700294 | 8/1977 | Fed. Rep. of Germany |
| 2278716 | 2/1976 | France |

Primary Examiner—James J. Seidleck
Assistant Examiner—W. R. H. Clark
Attorney, Agent, or Firm—Oblon, Spivak, McClelland, Maier & Neustadt

[57] ABSTRACT

A copolymer with stellate branching, of the general formula $[A-]_k X$, where A is the monovalent radical of a homopolymer, block copolymer or random copolymer of a conjugated diene and/or vinyl-aromatic hydrocarbon, k is a number from 1 to 10, and X is the k-valent radical of a coupling center produced by coupling with hexatriene, and the product of the hydrogenation thereof are described.

7 Claims, No Drawings

BRANCHED COPOLYMERS

The present invention relates to copolymers with stellate branching which comprise vinyl-aromatic hydrocarbons and conjugated dienes, which are accessible by anionic solution polymerization of monomers using organo-alkali metal initiators with subsequent coupling.

Organometallic initiators can be used in the reaction of vinyl-aromatic compounds and dienes to give living polymers, which can be modified by suitable agents (cf. M. Swarc: Living Polymers and Mechanisms of Anionic Polymerization, in Advances in Polymer Science 49, [1983], Springer Verlag). Alongside the introduction of polar end groups by terminating the reaction using electrophilic reactants, the coupling reaction is the most intensively investigated reaction. For the purposes of the invention, coupling is the linking, according to the primary valence, of two, three or more polymer segments via a suitable agent which reacts with the carbanionic centers of the living polymer chain, forming polymers of molecular weight $[M_n]k$, where $M_n$ is the number average molecular weight of the once-living, generally linear polymer, and k is the degree of coupling.

Depending on the choice of initiator and procedure, block polymers or random copolymers can be obtained (J. Appl. Polym. Sci. 22, [1978], pages 2007-2013).

Homopolymers, block copolymers and random copolymers of vinyl-aromatic compounds and dienes can be coupled to one another via multifunctional, reactive compounds. A large number of coupling reagents are described in the technical literature (Rubber Chem. and Techn. 49, (5), [1976], 1305).

Coupling reactions are a simple way of permanently modifying the properties of polymers. Thus, it is known, for example in the case of diene polymerization, that coupling can increase the Mooney viscosity, reduce the cold flow and modify the molecular weight distribution.

DE-B-1 128 666 discloses the polymerization of conjugated dienes in the presence of an organolithium initiator and divinylbenzene (DVB). DE-27 00 294 describes a variation of this process in which the DVB is added when the polymerization is complete. Polymers having a stellate structure and a spatially small coupling center are produced.

Similar products are obtained by coupling, as described in EP 0 161 021, with tri- and tetra-isopropenyl compounds. Further examples of the coupling of living polymers prepared anionically with polyvinylaromatic coupling agents are given in EP-A-083 574 and U.S. Pat. No. 4,116,917.

It is expected that the coupling reaction will improve the properties of the polymer, but it is important for some applications to achieve high coupling yields, while incomplete coupling may be advantageous for other purposes. High coupling yields are desired, for example, in the case of polymers used as viscosity index improvers in mineral oils. By contrast, defined proportions of uncoupled product improve the flow properties of stellate block copolymers during injection molding.

It is therefore desirable to employ coupling reagents which facilitate modification of the mean degree of coupling and of the proportion of uncoupled polymer as exactly as possible.

This is not the case for DVB; only 2 equivalents of DVB per reactive lithium atom are sufficient to cause substantial coupling (more than 90%, degree of coupling 8) of the polymer. An increase in the DVB/Li ratio is accompanied by an increase in the number of stellate branches in the polymer. The number of stellate branches possible is limited by steric factors, and an increase in the DVB/Li ratio (10:1) therefore has no further effect on the coupling yield.

Furthermore, an obstacle in the way of exact metering of the DVB is that it is usually only available in technical-grade quality (cf. U.S. Pat. No. 3,855,189), containing from 55 to 65% by weight of DVB as a mixture of its isomers along with ethylvinylbenzene and diethylbenzene.

The property profile of coupled polymers is in many cases optimal at a mean number of stellate branches of from 3 to 10; using DVB, however, this can be established only with considerable difficulties and with poor reproducibility.

It is therefore an object of the present invention to prepare stellate polymers using a coupling agent which is accessible in pure form by a simple method, and to find a process for coupling living polymers which facilitates exact modification of the number of stellate branches k at the peak of the molecular weight distribution function and at the same time places an upper limit on the degree of coupling, so that k preferably has a number average of less than or equal to 10.

We have found that this object is achieved according to the invention by using hexatriene of the general empirical formula $C_6H_8$ as the coupling agent.

The best of the various isomers of hexatriene has proven to be trans-1,3,5-hexatriene, which is preferably prepared by the process described in Liebigs Annalen der Chemie 608, (1957), pages 195-215.

Polymers with stellate branching, of the general formula- $[A-]_k X$, where A is the monovalent radical of a homopolymer, block copolymer or random copolymer of a conjugated diene and/or vinyl-aromatic hydrocarbon, k is a number from 1 to 10, and X is the k-valent radical of the coupling center produced by coupling with hexatriene, are obtained according to the invention by coupling the linear polymers containing active, terminal lithium-carbon bonds obtained from virtually complete anionic polymerization, by adding hexatriene or, if desired, a mixture of a diene or vinyl-aromatic compound and hexatriene. This procedure gives coupling centers which are spatially more expansive, which may be advantageous in the hydrogenation of the coupled polymers, since the hydrogenation times are considerably shorter. The degree of coupling k and the coupling yield can be established exactly through the molar ratio between hexatriene and the living polymers.

For the purposes of the present invention, homopolymers, copolymers and block copolymers, comprising vinyl-aromatic compounds and/or dienes are known polymers of this type, which can be obtained anionically from the corresponding monomers, for example using organoalkali metal initiators. Processes of this type are sufficiently well known that they need not be described here in greater detail (cf., for example, British Patent 1,444,680, Journal of Applied Polymer Science, 22, [1978], pages 2007-2013).

Suitable vinyl-aromatic compounds are, in particular, styrene, the various alkylstyrenes and vinylnaphthalene, and suitable dienes are butadiene, isoprene, 2,3-dimethylbutadiene, piperylene, phenylbutadiene and anionically polymerizable, conjugated $C_4$- to $C_{12}$-dienes. In addition to the respective homopolymers, it is also possible to use copolymers and known block copolymers of vinyl-aromatic compounds and dienes, and block copolymers having various random distributions of the monomers can be obtained, depending on the choice of initiator and solvent.

Suitable initiators are known monolithium hydrocarbons of the general formula RLi, where R is an aliphatic, cycloaliphatic, aromatic or mixed aliphatic-aromatic hydrocarbon radical, which can have from 1 to 12 carbon atoms. Examples of anionic initiators which are suitable for use according to the invention are methyllithium, ethyllithium, propyllithium, (n-, sec- and tert-)butyllithium, isopropyllithium, cyclohexyllithium, phenyllithium and tolyllithium. Preference is given to monolithiumalkyl compounds having from 2 to 6 carbon atoms in the alkyl chain, particular preference being given to n-butyllithium and sec-butyllithium.

The polymerization is generally carried out in an inert organic hydrocarbon as solvent. Suitable solvents are aliphatic, cycloaliphatic or aromatic hydrocarbons which are liquid under the reaction conditions and preferably contain from 4 to 12 carbon atoms. Examples of suitable solvents are isobutane, n-pentane, isooctane, cyclopentane, cyclohexane, cycloheptane, benzene, toluene or xylene, or mixtures of these. It is also possible to carry out the polymerization in the presence of small amounts, in general from $10^{-3}$ to 5% by weight, based on the total amount of solvent, of an ether, such as tetrahydrofuran, dimethoxyethane or phenyl methyl ether, through which the polymerization rate, the configuration of the diene segment and the random introduction of the monomers can be influenced in a known manner. The concentration of the monomers is unimportant and can be varied so that any desired apparatus can be used for the polymerization. The polymerization is usually carried out in from 10 to 30% strength by weight solutions.

The polymerization is carried out under conditions which are conventional for the anionic polymerization using organolithium compounds, in particular with exclusion of air and moisture. The polymerization temperature can be from 0° to 120° C., and is preferably kept at-from 40° to 80° C.

The polymerization is continued until virtually complete conversion of the monomers employed. In this way, a solution of living, linear polymers containing active, terminal carbanionic centers which are capable of further addition reaction with monomers is obtained.

The uncoupled polymers generally have mean molecular weights (Mn) of from 500 to 150,000 g/mol.

Suitable coupling agents are all conjugated olefinic compounds of the empirical formula $C_6H_8$, specifically cis- and trans-1,3,5-hexatriene and 3-methylene-1,4-pentadiene. These are compounds containing a total of three double bonds which are capable of forming a butadiene structure after addition of a polymer with carbanionic terminals to one of the three double bonds and subsequent addition of a further hexatriene molecule or a monomer. A further polymer with carbanionic terminals can be added to the butadiene sequence produced, thus starting the branch. Multiple repetition of the sequence of hexatriene addition and addition of a living polymer or consecutive addition of a plurality of hexatriene molecules and subsequent addition of the living polymer to the butadiene sequences produced results in the formation of a stellate polymer. Addition of two living polymers to one hexatriene molecule appears less probable due to the high electrostatic repulsion to be overcome in the second addition step. In contrast to DVB, whose structure permits independent reaction of the 2 vinyl groups, hexatriene does not facilitate starting from an independent reaction of the two terminal double bonds. It is furthermore possible for the introduction of the hexatriene into the polymer chain to take place in the 1,2-, 1,6- or 1,4-positions. In the latter case, two separate vinyl groups are formed which are not capable of addition of a living polymer. The differences in reactivity between hexatrienes on the one hand and DVB on the other hand explain the lower (compared with DVB) coupling efficiency of hexatrienes and thus also the superior metering properties. For coupling, from 2 to 100 mol of the pertinent hexatriene are preferably employed per mol of the living polymer. A very particularly preferred ratio is from 3 to 20 mol of triene to 1 mol of the living polymer. The stellate polymer formed after coupling is also a living polymer.

The coupling agent can be added to the living polymer in one or more portions, but it may be advantageous to feed hexatriene into the reaction vessel over a relatively long period of time after dilution with an inert solvent or a conjugated diene.

The coupling can be carried out in a broad temperature range, for example at from 20° to 120° C., preferably from 40° to 80° C. This reaction is also carried out in an inert atmosphere, for example under a protective gas.

The resultant living polymer with a stellate structure can be reacted further with more monomers, for example with the same or other dienes and/or vinyl-aromatic compounds of the above-described type. A reaction of this type not only increases the number of polymer chains, but also results in living polymers with a stellate structure which contain two or more different types of polymer chains.

Polymers containing different types of polymer chains can also be produced by preparing living polymers of different compositions separately and combining them before coupling.

The polymers with a stellate structure may have virtually any molecular weight, but usually have a mean molecular weight $M_n$ in the range from 25,000 to 1,000,000 g/mol, particularly preferably from 70,000 to 400,000 g/mol. The molecular weight is expediently determined by GPC, the mean molecular weight $M_n$ being determined by the strip method. The molecular weight at the peak maximum can be determined from a graph using a calibration curve. The polymers are also characterized by measuring the viscosity number in accordance with DIN 53 726.

Polymers with a stellate structure which are also living polymers can subsequently be deactivated in a conventional manner by adding a compound which reacts with the carbanionic group. Suitable deactivators of this type are compounds containing one or more active hydrogen atoms, such as water, alcohols and carboxylic acids, or compounds containing a halogen atom, such as benzyl chloride. The deactivators employed may also be compounds containing an ester group and carbon dioxide.

It is also possible to introduce functional end groups into the branched living polymers by means of appropriate reagents (ethylene oxide, ethylene sulfide or Schiff bases).

After the deactivation or functionalization and expediently before isolation of the product from the reaction mixture, the branched block copolymer can also be hydrogenated, either selectively or nonselectively, normally using molecular hydrogen and catalysts based on metals and metal salts of sub-group 8 of the Periodic Table. Suitable systems are described in U.S. Pat. No. 3,113,986, DE-B-1,222,260 and DE-A-2,013,263. The olefinic double bonds are hydrogenated here under mild conditions at a hydrogen pressure of from 1 to 100 bar and at from 25° to 150° C. The hydrogenation can also be carried out in the heterogeneous phase using nickel or platinum. The residual content of olefinic double bonds is usually less than 10%, preferably less than 3%. Preferred polymers for hydrogenation are those prepared in the presence of small amounts of ether.

In order to isolate the polymers, the polymer mixture can be heated directly to dryness in a conventional manner or treated with steam, the solvent being removed by distillation. It can also be precipitated in an excess of a nonsolvent, e.g. ethanol, separated off mechanically, dried and worked up by means of an extruder.

The coupled homopolymers or copolymers prepared by the process according to the invention can be mixed in a conventional manner with customary stabilizers, reinforcing agents, fillers and further additives.

The molecular weights of the polymers prepared in the examples were determined by GPC. The calibration substance used for the columns ($\mu$-Ultrastyragel ® 500, 1000, 1000 and 10000) was polystyrene for block copolymers and polyisoprene or polybutadiene for diene polymers. The mobile phase was THF. The molecular weights $M_n$ were calculated using a GPC software system from Polymer Standards (Mainz, Germany).

EXAMPLE 1

300 ml of cyclohexane, 1.2 ml of THF and 0.5 g of styrene are introduced into a temperature-controlled 1-liter reaction vessel which has been rinsed under pure nitrogen with a solution of n-butyllithium in cyclohexane and is equipped with stirrer and thermometer. A 0.2 molar solution of sec-butyllithium in hexane is added with vigorous stirring at 60° C. using an injection syringe until the mixture remains a pale yellow color. A further 1.8 mmol of sec-butyllithium are then added, and 34 g of styrene are then slowly added dropwise. After one hour, 28.2 g of butadiene are added, and the mixture is stirred at 60° C. for 90 minutes until polymerization is complete. A sample is taken from the reaction vessel, precipitated in ethanol, isolated and dried.

Sample 1: (linear polymer)
Molecular weight $M_n$: 47,000 g/mol

For coupling of the living polymer formed, 5.4 mmol of trans-1,3,5-hexatriene are subsequently added dropwise. The solution is stirred at 60° C. for one hour, during which the color changes from pale yellow to red. A sample is then removed.

Sample 2: (coupled polymer, 3 equivalents of trans-1,3,5-hexatriene)
Molecular weight $M_n$: 58,000 g/mol, coupling yield 35%, coupling peak maximum ($M_k$): 100,000 g/mol A further 5.4 mmol of trans-hexatriene are added dropwise, and the solution is heated at 60° C. for a further hour. After one hour, a further sample is removed.

Sample 3: (coupled polymer, 6 equivalents of trans-1,3,5-hexatriene)
Molecular weight $M_n$: 87,000 g/mol, coupling yield 75%, coupling peak maximum ($M_k$): 240,000 g/mol A further 5.4 mmol of trans-1,3,5-hexatriene are added dropwise. The mixture is stirred at 60° C. for a further hour, and the polymerization is then terminated using a few drops of methanol.

Sample 4: (final sample)
Molecular weight $M_n$: 110,000 g/mol, coupling yield 88%, coupling peak maximum ($M_k$): 260,000 g/mol In total, 16.2 mmol of trans-hexatriene are added dropwise, corresponding to 9 equivalents per mole of polymer with carbanionic terminals.

EXAMPLE 2

In a corresponding manner to Example 1, a linear copolymer of the same composition is prepared, but first butadiene and subsequently styrene are polymerized, so that the coupling takes place via benzyl anions.

Sample 1: (linear block copolymer)
Molecular weight ($M_k$): 57,000 g/mol Sample 2: (coupled polymer, 3 equivalents of trans-1,3,5-hexatriene)
Molecular weight ($M_n$): 98,000 g/mol, coupling yield 60%,
coupling peak maximum ($M_k$): 200,000 g/mol Sample 3: (coupled polymer, 6 equivalents of trans-1,3,5-hexatriene)
Molecular weight ($M_n$): 131,000 g/mol, coupling yield 75%,
coupling peak maximum ($M_k$): 350,000 g/mol Sample 4: (coupled polymer, 9 equivalents of trans-1,3,5-hexatriene)
Molecular weight ($M_n$): 150,000 g/mol, coupling yield 80%, coupling peak maximum ($M_k$): 410,000 g/mol.

EXAMPLE 3

A living butadiene-styrene block copolymer having a molecular weight of 28,000 g/mol is prepared in a corresponding manner to Example 2. 12 equivalents of trans-1,3,5-hexatriene are added per mole of carbanionically bonded lithium at 60° C. The mixture is stirred for a further one hour and the polymerization is then terminated using methanol.

Sample 1: (linear polymer)
Molecular weight ($M_n$) 28,000 g/mol

Sample 2: (coupled polymer, 12 equivalents of trans-1,3,5-hexatriene)
Molecular weight ($M_n$): 188,000 g/mol, coupling yield 96%, coupling peak maximum ($M_k$) 243,000 g/mol.

EXAMPLE 4

Using the procedure of Examples 1 and 2, a living polymer is prepared from 90% by weight of polybutadiene and 10% by weight of polystyrene and treated at 60° C. with 12 equivalents of trans-1,3,5-hexatriene per mole of macromolecules with carbanionic terminals. The polymerization is terminated after one hour using methanol.

Sample 1: (linear polymer)
Molecular weight ($M_n$): 42,000 g/mol
Sample 2: (coupled polymer, 12 equivalents of trans-1,3,5-hexatriene)
Molecular weight ($M_n$): 140,000 g/mol, coupling yield 87%,
coupling peak maximum ($M_k$): 260,000 g/mol

EXAMPLE 5

300 ml of cyclohexane, 1.2 ml of THF and 0.5 g of styrene are introduced into a temperature-controlled 1-liter reaction vessel which has been rendered inert and is provided with stirrer and thermometer. A 0.2 molar solution of sec-butyllithium in hexane is added with vigorous stirring at 60° C. using an injection syringe until the mixture remains a pale yellow color. A further 2.5 mmol of sec-butyllithium are then added, followed by slow dropwise addition of 60 g of butadiene. A sample is removed after 90 minutes. 30 mmol of trans-1,3,5-hexatriene are subsequently injected in, and the mixture is stirred at 60° C. for one hour.

Sample 1: (linear polymer)

Molecular weight ($M_n$): 26,000 g/mol

Sample 2 d polymer, 12 equivalents of trans-1,3,5-hexatriene)

Molecular weight ($M_n$): 110,000 g/mol, coupling yield 85%, coupling peak maximum ($M_k$) 210,000 g/mol.

EXAMPLE 6

A series of samples with the following properties was prepared as in Example 5, but using isoprene instead of butadiene:

Sample 1: (linear polymer)

Molecular weight ($M_n$): 26,000 g/mol

Sample 2: (coupled polymer, 12 equivalents of trans-1,3,5-hexatriene)

Molecular weight ($M_n$) 78,000, coupling yield 80%, coupling peak maximum ($M_k$): 167,000

EXAMPLE 7

The following results were achieved by repeating Example 5, but using isoprene instead of butadiene and without THF as cosolvent:

Sample 1: (linear polymer)

Molecular weight ($M_n$): 25,000 g/mol

Sample 2: (coupled polymer)

Molecular weight ($M_n$): 94,000 g/mol, coupling yield 84%, coupling peak maximum ($M_k$) 147,000 g/mol.

EXAMPLE 8

The selective hydrogenation of the copolymer from Example 1 was carried out in the polymerization solution. The hydrogenation catalyst employed was a mixture of 0.14 g of nickel(II) acetylacetonate and 3 ml of a 6% strength solution of triisobutylaluminum in toluene. The hydrogen-pressure in the hydrogenation reactor is 15 bar, and the temperature is kept at from 80° to 90° C. The hydrogenation of the olefinic double bonds is virtually complete (97%) after 600 minutes.

We claim:

1. A copolymer with stellate branching of the formula $[A]_k$-X, wherein A is the monovalent radical selected from the group consisting of a homopolymer, block copolymer or random copolymer of a conjugated diene; a homopolymer, block copolymer or random copolymer of a vinyl-aromatic hydrocarbon; and a homopolymer, block copolymer or random copolymer of a conjugated diene and a vinyl-aromatic hydrocarbon, k is a number from 1 to 10, and X is the k-valent radical of a coupling center produced by coupling with hexatriene of the empirical formula $C_6H_8$.

2. A hydrogenated copolymer as obtained by partial or complete hydrogenation of a copolymer of the general formula $[A-]_k X$ of claim 1.

3. In a method for preparing a copolymer comprising coupling a living polymer, the improvement wherein hexatriene of the empirical formula $C_6H_8$ is used as a coupling agent to obtain a copolymer with satellite branching.

4. The method according to claim 3, wherein said living polymer is a linear polymer containing active, carbanionic terminals.

5. The method according to claim 3, wherein said living polymer is selected from the group consisting of a homopolymer, block copolymer or random copolymer of a conjugated diene, a homopolymer, block copolymer or random copolymer of a vinyl-aromatic hydrocarbon, and a homopolymer, block copolymer or random copolymer of a conjugated diene and a vinyl-aromatic hydrocarbon.

6. A copolymer according to claim 1, wherein the hexatriene is cis-1,3,5-hexatriene, trans-1,3,5-hexatriene or 3-methylene-1,4-pentadiene.

7. A copolymer according to claim 1, wherein the hexatriene is trans-1,3,5-hexatriene.

* * * * *